United States Patent [19]

Salzman et al.

[11] Patent Number: 4,834,932

[45] Date of Patent: May 30, 1989

[54] METHOD FOR MAKING AN END CONNECTION FOR COMPOSITE SHAFTS

[75] Inventors: Ronald N. Salzman; Robert A. Blakley; Marlin D. Schutte; Keith T. McDermott, all of Rochester, N.Y.

[73] Assignee: General Signal Corporation, Stamford, Conn.

[21] Appl. No.: 108,663

[22] Filed: Oct. 15, 1987

Related U.S. Application Data

[62] Division of Ser. No. 846,318, Mar. 31, 1986, Pat. No. 4,722,717.

[51] Int. Cl.[4] .................. B29C 45/14; B29C 63/30
[52] U.S. Cl. ............................ 264/255; 264/250; 264/257; 264/258; 264/263; 264/267
[58] Field of Search ............. 264/263, 267, 258, 257, 264/255, 250

[56] References Cited

U.S. PATENT DOCUMENTS

| 4,283,821 | 8/1981 | Paakkunainen | 29/132 X |
| 4,299,508 | 11/1981 | Kerscher et al. | 403/267 X |

FOREIGN PATENT DOCUMENTS

| 807036 | 9/1956 | United Kingdom | 464/89 |
| 2070193 | 9/1981 | United Kingdom | 403/265 |

Primary Examiner—Jan H. Silbaugh
Assistant Examiner—Kelley M. Sidwell
Attorney, Agent, or Firm—Martin LuKacher

[57] ABSTRACT

A method for making an end connection for a shaft made of composite material, which accommodates for differences in stiffness, thermal expansion, and chemical resistance between the shaft and the member connected thereto and operates under oscillating torque, thrust, and bending loads, and also provides for manufacturing flexibility in enabling the shaft and connection to be produced as separate parts which are formed when final assembly is to occur. The connection has a male insert which is inserted into the end of the composite shaft. Axial and circumferential grooves are cut in the surfaces of the male insert and the shaft. These grooves are aligned to form circumferential and axial keyways which intersect each other. Material is injected into the keyway and polymerizes to form structural keys which transmit the thrust and torque, while locking the insert member and the shaft permanently together. The bending loads are transmitted through the tight fit extending axially between the composite shaft, insert member and keys. The radial thickness of the end of the shaft, the amount and orientation of the reinforcing fibers therein and the insert are matched so that their stiffness index approximately match. The composite shaft may be connected to a mixing impeller to provide a reliable support and drive therefor.

4 Claims, 3 Drawing Sheets

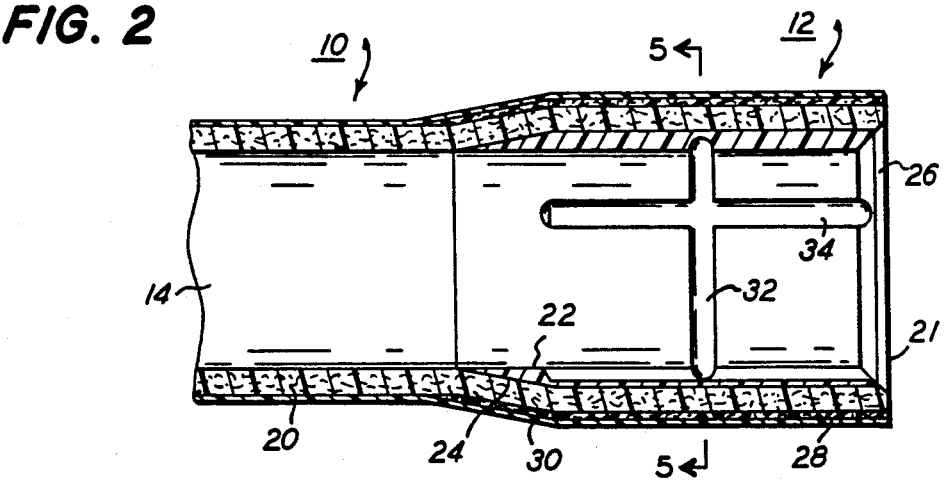
FIG. 2
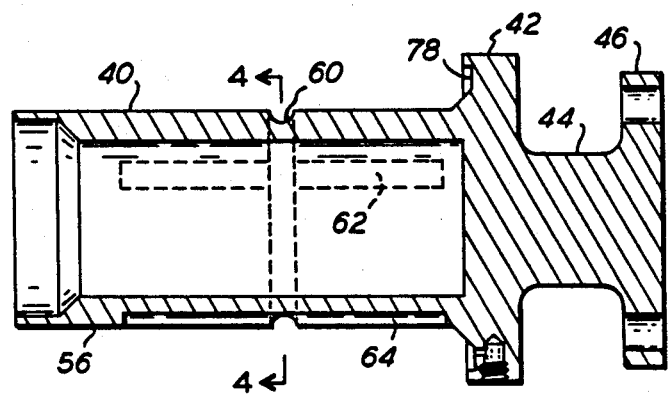
FIG. 3
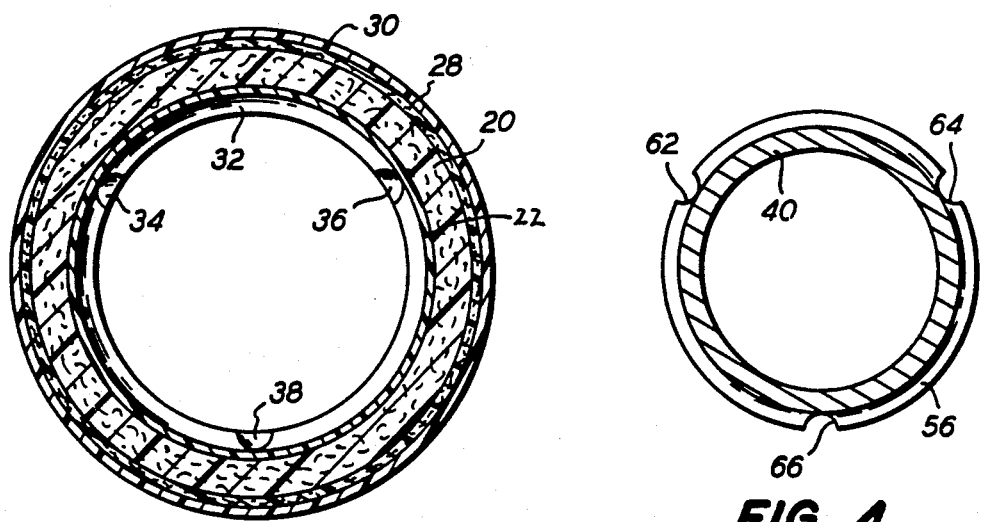
FIG. 5
FIG. 4

METHOD FOR MAKING AN END CONNECTION FOR COMPOSITE SHAFTS

This is a division, of Application Ser. No. 846,318, filed Mar. 31, 1986 now U.S. Pat. No. 4,722,717.

DESCRIPTION

The present invention relates to couplings for transmitting torque, thrust, and bending loads between members, and particularly to end connections for composite shafts which enables them to be connected to drive members of various types and kinds. The invention also provides a method for making such couplings and end connections.

The invention is especially suitable for use in providing end connections for composite mixer drive shafts, which have mixing impellers attached thereto. Mixing impeller systems and mixer shafts, in connection with which the invention is especially useful, are described in a co-pending application filed in the United States Patent Office and assigned to the same assignee as the present application (Ser. No. 760,370, filed July 30, 1985), now U.S. Pat. No. 4,722,608. The invention is suitable wherever couplings for handling and transmitting torque, thrust and bending loads, which can be relied upon not to work loose, are required; for example in automotive, helicopter, boat, and pump applications.

Composite shafts are made in tubular form and of fiber reinforced plastic material. The reinforcing fibers are usually glass fibers oriented at prescribed angular relationships with respect to the axis of the shaft in order to transmit the loads most efficiently. These fibers may be in the form of filaments which are wound or otherwise laid up to define the shaft. Such shafts have many advantages due to their high strength and their low weight. Composite shafts have a disadvantage which arises out of their stiffness. They are considerably less stiff than metal members, such as drive shafts and couplings to which they must be connected. The differential in stiffness can result in stress risers beyond the limits of the composite material. The problem of providing couplings, particularly end connections to composite shafts, may be solved by providing a composite flange structure on the shafts at the coupling end. However, the diameters necessary may be so large as to prevent the shafts from being used in their applications. For example, in the case of mixer shafts which must be inserted into a tank through a nozzle in a man-way or opening at the top of the tank, the enlarged coupling end may exceed the diameter of the nozzle.

The coupling must also be capable of handling oscillating loads in mixing applications. These mechanical loads are thrust and torque loads as well as bending loads due to fluid forces on the impeller. These bending forces are applied through a lever arm which is the length of the shaft. In addition the thrust loads, in industrial mixing applications, may be of the order of one thousand pounds or more depending on the size, speed and type of mixer. Such loads have a wide range of fluctuating components and tend to cause couplings to work loose.

Adhesive bondings are also unsatisfactory since they may be subject to thermal expansion different from the shafts and the members coupled thereto through the adhesive bond. The adhesive bondings are also unsatisfactory because they may have insufficient chemical resistance. The combined actions of fluctuating loads, differential thermal expansions, and chemical attack makes a bonded connection unsatisfactory.

Various couplings have been proposed for composite shafts used in other applications than as mixer shafts. Where composite shafts have been proposed for use as vehicle drive shafts, end connections have been made by fabricating the shaft directly upon a metal sleeve located at the end of the shaft. Filaments of reinforcing fibers which are coated with resinous material overwrapped directly upon the sleeve. It then polymerizes in place. The surface configuration of the sleeve has been knurled or made polygonal to provide mechanical interference. Reference may be had to the following patents for further information respecting composite drive shafts and end connections made by the overwrapping technique: Worgan, et al, U.S. Pat. No. 4,089,190, issued May 16, 1978; Yates, et al, U.S. Pat. Nos. 4,171,626, issued Oct. 23, 1979; Yates, et al, 4,187,135, issued Feb. 5, 1980; Yates, et al, 4,236,386, issued Dec. 2, 1980; Yates, et al, 4,238,539, issued Dec. 9, 1980; Yates, et al, 4,265,951, issued May 5, 1981; and McLain, et al, U.S. Pat. No. 4,248,061, issued Feb. 3, 1981. Mechanical connections to composite shafts have also been suggested wherein the shaft end is pressed into a metallic sleeve and collar which cuts into the wall of the composite shaft (See Hornig, et al, U.S. Pat. No. 4,451,245, issued May 29, 1984).

Each overwrapped coupling is designed for a particular application, with special dimensional relationships and constructions of the shaft where it is overwrapped on the sleeve. In mixing applications, the environments may have dramatic differences. The loads arising out of mixing of heavy slurries may be far different from those in sewage treatment. Moreover, the environments may differ drastically; some requiring exotic metals in a coupling to a composite shaft where corrosive materials are to be mixed. It is desirable to avoid the need to build custom designed end connections and couplings before fabricating the shaft as would be required for any overwrap process. It is a feature of this invention to enable the separate and independent fabrication of the shaft and metal parts. This is especially desirable when special alloys are required. Standard composite shafts and metallic coupling members may be selected from stock and readily assembled to provide a composite shaft end connection for the specified application.

Various ways have been suggested for assembling parts, as by the insertion of keys in slots (See Adelizzi, U.S. Pat. No. 3,877,827, issued Apr. 15, 1975) or the use of filler in spaces left in a joint (See Powondra, U.S. Pat. No. 3,999,786 issued Dec. 28, 1976); however the problems of joining two members does not provide any solution to the transmission of oscillating thrusts, torque and bending loads; nor to the problems of providing end connections to composite shafts.

It is, in general, the object of the invention to provide improved couplings for the transmission of thrust, torque and bending loads between members, and to methods for making such couplings.

More specifically, an object of the invention is to provide an improved end connection for a composite shaft which affords reliable transmission of loads such as generated by rotating equipment connected to the shafts, such as mixing impellers.

It is also an object of the invention to provide an improved method for making end connections to a composite shaft, both simply and effectively, so as to provide long term reliability under torque, thrust and bending loads.

It is a further object of the present invention to provide an improved end connection assembly for a composite shaft capable of using shafts and coupling members of like design for different applications and which need not be custom designed for specific applications, and to a method, having a high degree of manufacturing flexibility, which may be used in making such end connections.

Briefly described, a composite shaft end connection assembly embodying the invention uses the end (called the "connection end") of a structural composite tubular shaft of fiber filament reinforced plastic material and a connector sleeve. The sleeve, which may be of metal, is disposed at the connection end of the shaft. The shaft has a tubular body of composite comminuted fiber reinforced plastic material integral with the shaft on the inside thereof. The tubular body defines the inside surface of the shaft at the connection end. The connector sleeve is disposed in the shaft at the connector end, and its exterior surface forms the interface with the shaft with a tight fit between the male sleeve and the female shaft. The sleeve has a circumferential groove in its exterior surface and the inside surface of the shaft has a circumferential groove in the tubular body which extends into its inside surface to a depth above the tubular shaft. The tubular body is of nonstructural material. The groove is confined to the nonstructural material body. The depth of the groove does not extend into the fiber filaments of the shaft and does not adversely affect the structural properties of the shaft.

An axial groove, which preferably intersects and is perpendicular to the circumferential groove, is also provided in the tubular body of nonstructural material. The sleeve has a circumferential groove and an axial groove parallel to the circumferential and axial grooves in the tubular body. The sleeve is disposed in the shaft with the grooves aligned to define keyways which are circumferential and axial. Keys are provided in these keyways, preferably by injecting resinous material (either a reinforced or non-reinforced thermosetting resin) into the keyway. The keys are formed when the injected material polymerizes. The keys are totally encapsulated. No adhesive bond is necessary. Because of the orientation of the keys and the tight fit between the male and female parts along the length of the coupling, the high thrust, torque and bending loads of the sort arising in mixing applications can be handled without causing the coupling to work loose. The connection end of the shaft is made, as by providing layers of fiber filament reinforcing material such that the stiffness index of the connection end (the product of Young's modulus-E and its area moment of inertia-I) is approximately matched to the stiffness index of the sleeve. The shaft thickness can be increased and the sleeve thickness may be reduced in a transition area where the shaft merges with its connection end, as by tapering the thickness of the sleeve and adding extra structure to the shaft. Accordingly, a coupling and end connection of dissimilar materials can be provided without causing stress risers at their interface which could result in failure of the coupling.

The foregoing and other features, objects and advantages of the invention, as well as a presently preferred embodiment thereof and the best mode presently known for practicing the invention, will become more apparent from a reading of the following description in connection with the accompanying drawings in which:

FIG. 2 is a fragmentary view illustrating the composite shaft without the sleeve insert in the end connection area thereof;

FIG. 3 is a sectional view showing the sleeve and the plate, stem and flange at the upper end thereof, which is part of the end connection assembly shown in FIG. 1;

FIG. 4 is a sectional view along the line 4—4 in FIG. 3;

FIG. 5 is a sectional view along the line 5—5 in FIG. 2; and

Figure 1:
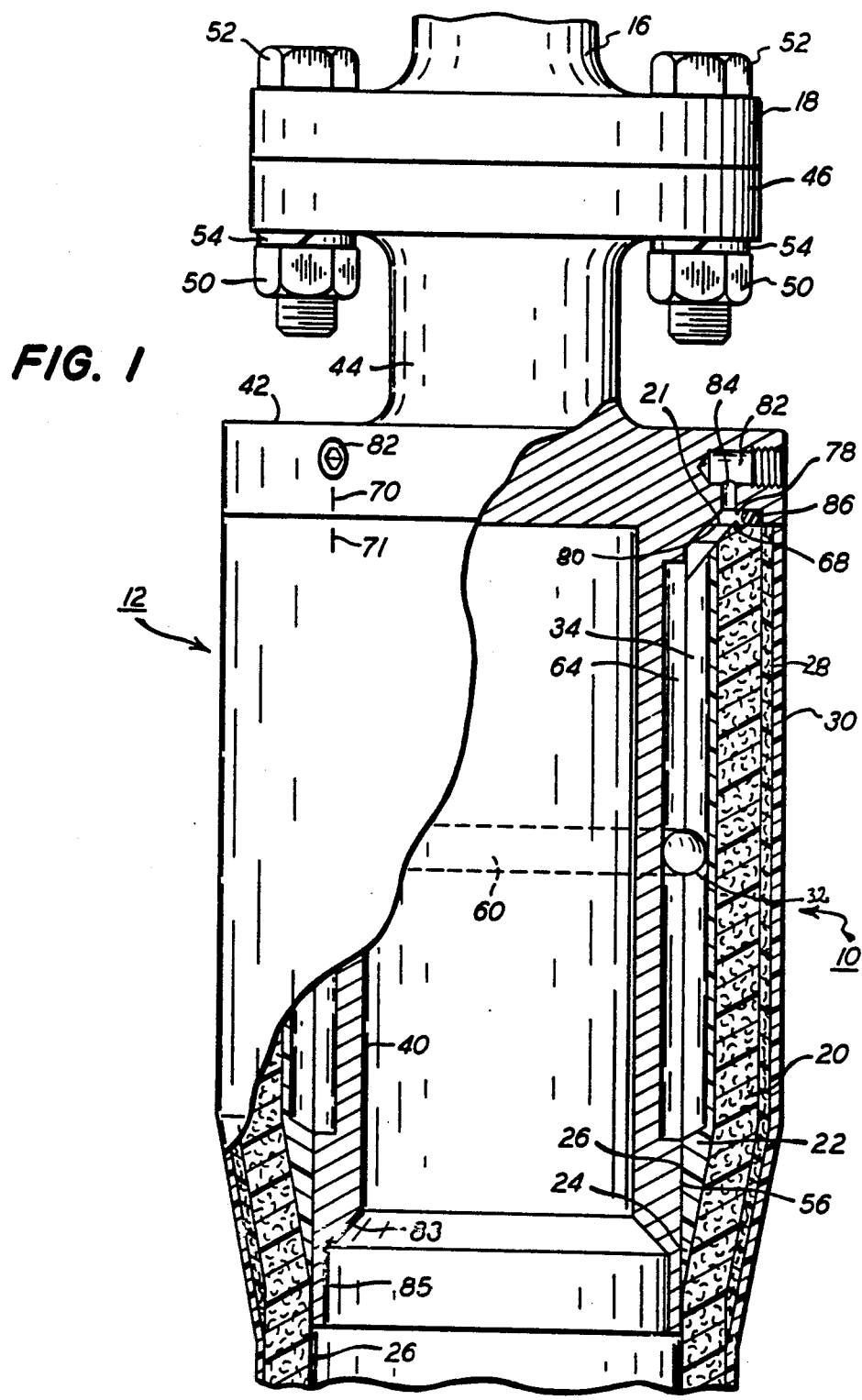
FIG. 1 is a fragmentary view, partially in section, illustrating the end connection assembly provided in accordance with a presently preferred embodiment of the invention.
Figure 6:
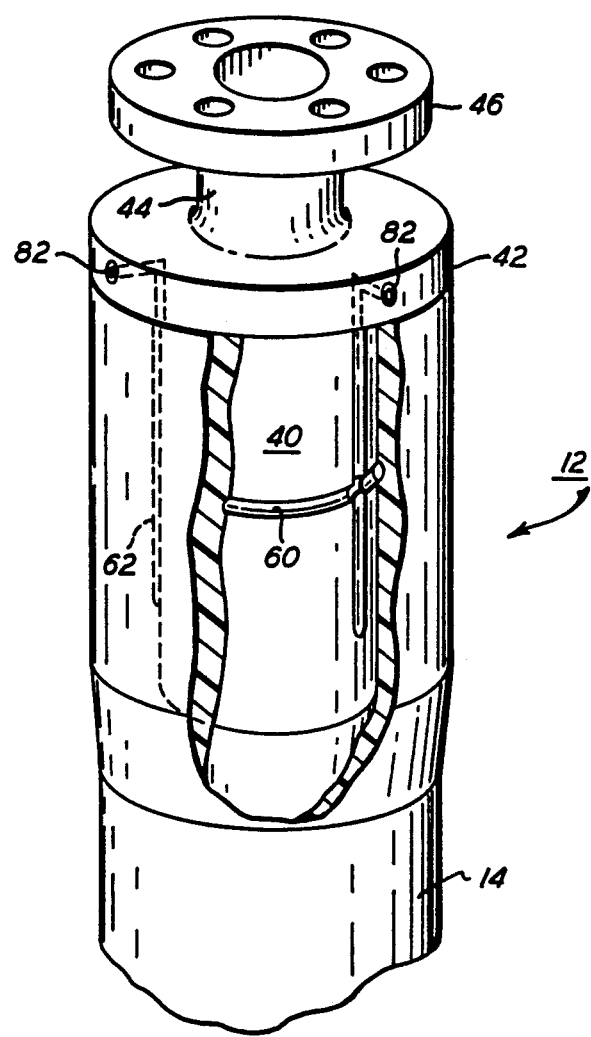
FIG. 6 is a perspective view showing the end coupling assembly illustrated in FIG. 1.

Referring more particularly to the drawings, there is shown a composite shaft 10 having a connection end 12 illustrated in an enlarged scale in FIG. 1. The shaft extends longitudinally away from the connection end 12 to a shaft region 14. For mixing applications, the mixing impeller is connected in this shaft region which may be several feet long. A hub, not shown, but which is described in the above-identified U.S. patent application, Ser. No. 760,370, now U.S. Pat. No. 4,722,608 provides for the connection of the impeller to the shaft in the region 14. The shaft is adapted to be driven by a motor through a transmission, such as a gear box. This gear box has an output shaft 16 with an end flange 18. The end connection 12 provides a reducer coupling to the flange 18, since the diameter of the shaft in the end connection area thereof is larger than the diameter of the flange 18.

The shaft 10 is a structural composite tubular shaft of fiber filament reinforced plastic material 20. This material provides the principal shaft structure. The filaments may be wound at different angles in order to provide a shaft structure capable of carrying the specified design loads. The techniques for fabricating such tubular shafts are known in the art and will not be described in detail herein. Briefly, they utilize a mandrel on which the resin-coated filaments are wound with the requisite density and angle of wrap. The shafts may also be made up of mats of filaments which can provide the structural support for the shaft.

A mat of non-structural fiber reinforced resinous material is used to provide a machinable non-structural layer 22 in the end connection region 12 of the shaft. This mat may be layered on the mandrel at the end of the shaft with the lower end 24 of the mat tapered. The mat conforms to the mandrel and the tubular shaft filaments are wound over the mat. The mat defines the inside surface 26 of the shaft in the end connection area 12. Past the tapered transition 24 of the inner layer 22, the inside surface 26 of the shaft is provided by the structural fiber filament reinforced shaft 20. The non-structural layer 22 consists of a chopped mat with layers of nexus of C-glass veil. This covering is also known as the chemical processing industry ("CPI") corrosion barrier and is available commercially.

In order to provide additional strength, and especially to resist the bending moments on the shaft in the end connection area 12, this area is provided with a hoop reinforcement layer 28. This layer may be wound over the shaft layer 20. The filaments in this layer are essentially radially wound without significant helical pitch. The hoop layer may also be provided by a mat of filaments having principal filaments which are parallel to each other. These mats are wrapped around the shaft layer 20 in the end connection area 12. The thickness of the hoop layer 28 tapers to provide a smooth transition at the bottom of the end connection area 12. The taper may start somewhat below the inner non-structural layer 22.

A corrosion barrier layer 30, for example of veil (thin fiber) material, which has a high resin content, encompasses the hoop layer 28 in the end connection area 12 and also the length of the shaft 20.

A circumferential groove 32, preferably semi-cylindrical in cross-section, is cut into the non-structural layer 22. This groove 32 is preferably perpendicular to the axis of the shaft. The inner non-structural layer provides sufficient strength to transmit loads through the groove and without affecting the structural layers 20 of the shaft 10. The depth of the groove 32 is shallower than the thickness of the non-structural layer 22. Preferably the circumferential groove 32 is disposed midway of the end connection area. However, its location is not critical so long as it is below the end face 21 of the shaft. In addition to the circumferential groove 32, a plurality, preferably three axial grooves 34, 36 and 38, is cut 120° apart, into the inside surface 26 of the inner layer 22. These grooves are preferably perpendicular to the circumferential groove 32 and are therefore parallel to the axis of the shaft 10. The axial grooves are also preferably semi-circular in cross-section. The lower ends of the axial grooves 34, 36, and 38 taper in depth. The depth of these grooves 34, 36 and 38, like the circumferential groove 32, is shallower than the thickness of the non-structural inner layer 22. The fibers of the structural shaft layer 20 are not cut and the shaft structure is, therefore, not affected by any of the grooves 32, 34, 36 and 38.

The end area of the shaft 10 is a female part of the end connection 12. The male part is provided by a metal sleeve 40 having an end plate 42, which is a disc of diamter equal to the diameter of the connection area 12 of the shaft 10. This sleeve may be called a connector sleeve. This plate 42 also seals the inside of the shaft. The plate 42 has a central stem 44 which is connected to a flange 46. The flange 46 is of the same diameter as the flange 18 of the output shaft 16. The arrangement provides a reducer coupling. By selecting the proper diameters for the flange 46 it can readily be mated to an output flange of any diameter. The flanges 18 and 46 may be connected by nuts 50, bolts 52, and lockwashers 54.

The exterior surface 56 of the insert sleeve 40 is approximately the same diameter as the inside surface 26 of the shaft 20 and provides a tight fit at the interface of these surfaces 26 and 56. The bending loads are transmitted through this interface and are distributed (not concentrated) along the interface.

The inside surface 56 is provided with a hemispherical circumferential groove 60 and three transverse grooves 62, 64, and 66 which are desirably 120° apart. These grooves 60, 62, 64 and 66 are parallel to corresponding grooves 32, 34, 36, and 38 in the inside surface 26 of the shaft 10. The sleeve is inserted into the shaft, as the female part of the end connection, with the circumferential grooves 32 and 60 in alignment and with the perpendicular transverse grooves 34, 36 and 38 in the shaft in alignment with the perpendicular transverse grooves 62, 64 and 66 in the sleeve. When the end 21 of the shaft is in contact with an O-ring 86 entrapped between surface 68 and the bottom of the plate 42, the dimensions are such as to bring the circumferential grooves 32 and 60 into alignment. Aligning marks 70, 71 may be placed on the edge of the plate 42 and on the outside of the connection end 12, so as to provide assurance that the axial grooves are in alignment. When aligned, the grooves provide circular (in cross-section) voids. These voids define keyways running axially and circumferentially in the end connection area 12 of the shaft. The bottom surface 68 of the plate is formed with a circular notch 78. A passage 80 interconnects the circular notch 78 and the keyway (the void) formed between the axial grooves in the shaft and the axial grooves in the sleeve. An injection port is provided by holes 82 and 84 which are drilled in the plate 42. The hole 82 may be closed by a plug (not shown) which is threaded therein.

After the sleeve is assembled into the end area 12 of the shaft 10, keys are formed in the keyways by injecting resinous material through the port 82, the hole 84, the notch 78 and the passage 80 into the keyways. The keyways may be sealed and the plate 42 disposed in sealing relationship with the inside of the shaft 12 by means of the "O" ring 86.

The injected resin may be a pure resin or a reinforced (with short fibers) resin, preferably thermosetting, which when it polymerizes, forms a structural key.

The circumferential key transmits thrust, while the axial keys transmit torque. The sleeve 40 and the shaft are permanently locked in position by the molded-in-place keys. The keys are totally encapsulated.

It can be seen that the commonality between the shaft and the sleeve is principally in the grooves. Such grooves can be of identical length and shape in a large number of different parts. Accordingly, there can be different shaft parts and sleeve parts. The sleeves may be made of exotic material, where necessary, in order to withstand corrosive atmospheres. Thus, the design of these shaft and sleeve insert parts is independent of the application. Various shaft and sleeve parts may be stocked and assembled to meet the requirements of specified applications.

It is desirable to match the stiffness of the sleeve and the stiffness of the shaft in the end connection area 12. This can be readily accomplished by selecting the density of the composite material and its thickness. In addition the fiber density (the ratio of fiber (glass) to resin by weight) and the thickness of the layers can be varied in order to provide for similar thermal expansion in both the sleeve 40 and the composite shaft.

The sleeve 40 may be counterbored at 83 so as to reduce its wall thickness in the lower end 85 of the sleeve. This provides a reduction in stiffness of the sleeve corresponding to the reduction in stiffness of the shaft in the transition area at the bottom of the end connection.

In determining the stiffness, it is desirable to use the stiffness index (the product of Young's modulus-E and the area moment of inertia-I). This stiffness index takes into account both material properties and sizes of the parts so as to provide for approximately the same stiffness characteristics which avoid stress risers which can cause a failure in the coupling.

From the foregoing description it will be apparent that there has been provided an improved connection for male and female parts and particularly an end connection for composite shafts. Variations and modifications in the herein described composite shaft end connection, within the scope of the invention, will undoubtedly suggest themselves to those skilled in the art. For example, the end plate 42 on the sleeve 40 may be separate parts, rather than an integral one piece of metal as illustrated. The same may be true for the stem 44 and the flange 46 of the sleeve arrangement. Accordingly, the foregoing description should be taken as illustrative and not in a limiting sense.

We claim:

1. The method of making an end connection to a tubular shaft of composite filament fiber reinforced solidified resin material, which comprises forming intersecting transverse and circumferential grooves in an exterior surface of a connector sleeve, forming a tubular body of composite non-structural fiber reinforced solidified resin on an inside surface of said shaft, forming intersecting circumferential and transverse grooves in the inside surface of said tubular body to a depth less than said inside surface of said shaft, inserting said connector sleeve into said tubular body with said sleeve's exterior surface and said tubular body's inside surface adjoining each other and said grooves in said surfaces of said tubular body and shaft in alignment to form keyways, and injecting resinous material in said keyways and allowing said resin to solidify to provide keys connecting said tubular shaft and said connector sleeve.

2. The method according to claim 1 further comprising forming a layer of composite hoop wound fiber filament reinforced resin encompassing said shaft at least in the region thereof along said connector sleeve.

3. The method according to claim 1 further comprising the step of forming said shaft with a thickness of fiber reinforced material in said region thereof around said connector sleeve sufficient to provide a stiffness in said region approximately matching the stiffness of said connector sleeve.

4. The method according to claim 3 further comprising inwardly tapering the radial thickness of said shaft and said connector sleeve to provide a gradual change in their stiffness in the region around the end of said sleeve which is disposed away from said end connection.

* * * * *